US011410046B2

(12) United States Patent
Liu et al.

(10) Patent No.: US 11,410,046 B2
(45) Date of Patent: Aug. 9, 2022

(54) LEARNING-BASED SERVICE MIGRATION IN MOBILE EDGE COMPUTING

(71) Applicant: Cisco Technology, Inc., San Jose, CA (US)

(72) Inventors: Dantong Liu, Mountain View, CA (US); Qing Zhao, Fremont, CA (US); Khashayar Mirfakhraei, Los Altos, CA (US); Gautam Dilip Bhanage, Milpitas, CA (US); Xu Zhang, Fremont, CA (US); Ardalan Alizadeh, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/474,191

(22) Filed: Sep. 14, 2021

(65) Prior Publication Data
US 2021/0406696 A1    Dec. 30, 2021

Related U.S. Application Data

(62) Division of application No. 16/375,315, filed on Apr. 4, 2019, now Pat. No. 11,132,608.

(51) Int. Cl.
*H04L 67/10* (2022.01)
*G06N 3/08* (2006.01)
(Continued)

(52) U.S. Cl.
CPC .............. *G06N 3/084* (2013.01); *G06N 3/04* (2013.01); *H04L 41/0893* (2013.01);
(Continued)

(58) Field of Classification Search
CPC ...... G06N 3/084; G06N 3/04; H04L 41/0893; H04L 41/50; H04L 67/10; H04L 67/148
See application file for complete search history.

(56) References Cited

U.S. PATENT DOCUMENTS 10,007,513 B2   6/2018  Malladi et al.
10,766,136 B1 *  9/2020  Porter ....................... G06N 3/04
(Continued)

FOREIGN PATENT DOCUMENTS

CN          108337691 A      7/2018

OTHER PUBLICATIONS

Andrew Machen et al., Live Service Migration in mobile Edge Clouds, arxiv.org, Aug. 2, 2017, pp. 1-8.
(Continued)

*Primary Examiner* — Viet D Vu
(74) *Attorney, Agent, or Firm* — Merchant & Gould P.C.

(57) ABSTRACT

Learning-based service migration in mobile edge computing may be provided. First, a service migration policy may be created for a network that includes a plurality of edge clouds configured to provide a service to users. Next, a movement of a user receiving the service from a source edge cloud may be detected. The source edge cloud may be associated with a first area and the detected movement may be from the first area to a second area. Then, the service migration policy may be applied to determine whether to migrate the service for the user from the source edge cloud. In response to determining to migrate the service, a target edge cloud may be identified and the service for the user may be migrated from the source edge cloud to the target edge cloud. The service migration policy may then be updated based on a success of the migration.

14 Claims, 7 Drawing Sheets

(51) Int. Cl.
- *G06N 3/04* (2006.01)
- *H04L 41/0893* (2022.01)
- *H04L 41/50* (2022.01)
- *H04L 67/148* (2022.01)

(52) U.S. Cl.
CPC .............. *H04L 41/50* (2013.01); *H04L 67/10* (2013.01); *H04L 67/148* (2013.01)

(56) References Cited

U.S. PATENT DOCUMENTS

| | | |
|---|---|---|
| 2004/0221019 A1 | 11/2004 | Swildens et al. |
| 2010/0161760 A1 | 6/2010 | Maloo |
| 2013/0091442 A1 | 4/2013 | Diab |
| 2014/0173232 A1 | 6/2014 | Reohr et al. |
| 2020/0128072 A1 | 4/2020 | Trim et al. |
| 2020/0166896 A1* | 5/2020 | Clune .................... G06N 3/086 |
| 2020/0196210 A1* | 6/2020 | Kanitkar ......... H04W 36/00835 |
| 2020/0241878 A1* | 7/2020 | Chandak ............... G06F 9/4806 |

OTHER PUBLICATIONS

Min Chen et al., A Dynamic Service-Migration mechanism in Edge Cognitive Computing, arxiv.org, Aug. 22, 2018, pp. 1-15.

Shangguang Wang et al., A Survey on Service Migration in Mobile Edge Computing, sguangwang.com, Apr. 15, 2018, pp. 1-18.

S. Wang, R. Urgaonkar, T. He, M. Zafer, K. Chan and K. K. Leung, "Mobility-Induced Service Migration in Mobile Micro-clouds," 2014 IEEE Military Communications Conference, Baltimore, MD, 2014, pp. 835-840.

A. Ksentini, T. Taleb and M. Chen, "A Markov Decision Process-based service migration procedure for follow me cloud," 2014 IEEE International Conference on Communications (ICC), Sydney, NSW, 2014, pp. 1350-1354.

T. Taleb and A. Ksentini, "An analytical model for Follow Me Cloud," 2013 IEEE Global Communications Conference (GLOBECOM), Atlanta, GA, 2013, pp. 1291-1296.

K. Mitra, S. Saguna, C. Ahlund and D. G. Luleá, "M2C2: A mobility management system for mobile cloud computing," 2015 IEEE Wireless Communications and Networking Conference (WCNC), New Orleans, LA, 2015, pp. 1608-1613.

\* cited by examiner

LEARNING-BASED SERVICE MIGRATION IN MOBILE EDGE COMPUTING

CROSS-REFERENCE TO RELATED APPLICATION

This application is a divisional of U.S. patent application Ser. No. 16/375,315, (now U.S. Pat. No. 11,132,608) filed Apr. 4, 2019, titled "Learning-Based Service Migration in Mobile Edge Computing", the entire contents of which is incorporated herein by reference

TECHNICAL FIELD

The present disclosure relates generally to service migration in mobile edge computing.

BACKGROUND

Mobile edge computing provides a network architecture that enables cloud computing capabilities at an edge of a network to move computational resources closer to physical locations of devices receiving service from the network. For example, mobile edge computing may be implemented at cellular base stations or other nodes at an edge of a cellular network. By moving computational resources closer to the devices' physical locations, network congestion may be reduced and network performance may be improved.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
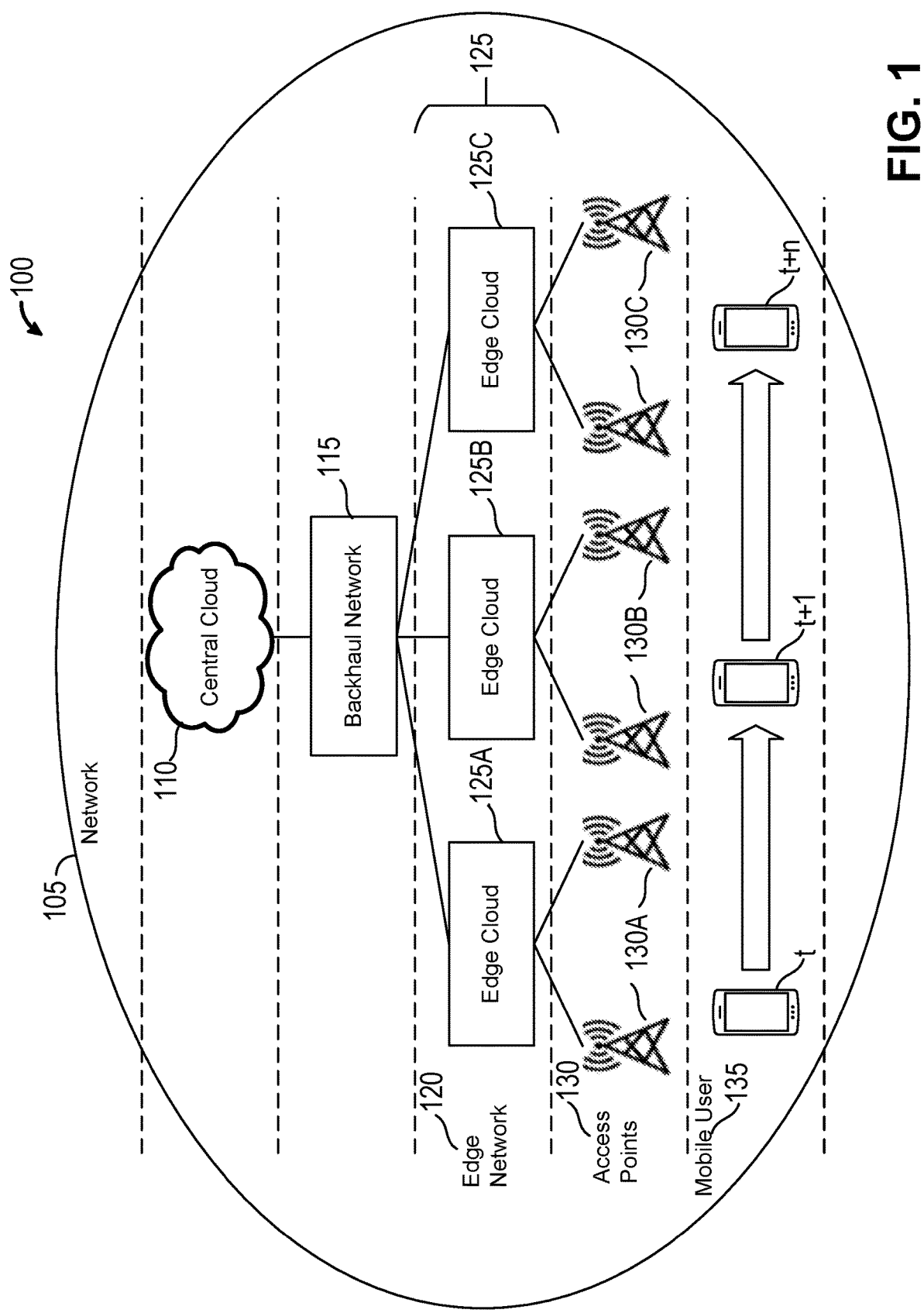
FIG. 1 shows an operating environment for providing learning-based service migration.

Learning-based service migration in mobile edge computing may be provided. First, a service migration policy may be created for a network that includes a plurality of edge clouds configured to provide a service to users. Next, a movement of a user receiving the service from a source edge cloud may be detected. The source edge cloud may be associated with a first area and the detected movement may be from the first area to a second area. Then, the service migration policy may be applied to determine whether to migrate the service for the user from the source edge cloud. In response to determining to migrate the service, a target edge cloud may be identified and the service for the user may be migrated from the source edge cloud to the target edge cloud. The service migration policy may then be updated based on a success of the migration.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Mobile edge computing provides a network architecture that may enable cloud computing capabilities at an edge of a network to move computational resources closer to devices communicatively coupled to and receiving service from a network, the devices hereinafter referred to as users. By implementing mobile edge computing functionalities within entities at the edge of the network, hereinafter referred to as edge clouds, network congestion may be reduced and network performance may be improved. However, edge clouds often have relatively small coverage area, which may pose a problem when a user is mobile. For example, a user may move across areas covered by different edge clouds. In one instance, an edge cloud initially providing network service to the user may maintain provision of service to the user despite the user's movement. In another instance, the service may be migrated to another edge cloud serving the new area into which the user has moved.

Service migration to a new edge cloud may be costly, but significant network performance degradation may occur if the service is maintained at the initial edge cloud. It may be difficult to determine when and where to the migrate the service to ensure both cost efficiency and consistent Quality of Service (QoS) and network performance for the user. Embodiments of the disclosure may provide a way to overcome this problem, by developing a learning-based service migration policy framework, where the policy may be applied when the user moves from one area to another to determine whether to migrate the service for the user and if so, to which edge cloud the service should be migrated to.

FIG. 1 shows an operating environment 100 for providing learning-based service migration. As shown in FIG. 1, operating environment 100 may comprise a network 105. Network 105 may comprise, but is not limited to, a central cloud 110, a backhaul network 115, an edge network 120 comprising a plurality of edge clouds 125, a plurality of access points 130, and a mobile user 135.

Central cloud 110 may be a computing environment, having one or more servers and at least one data store for data persistency that can be attached to each server. In some embodiments, central cloud 110 may serve a primary role of data storage for network 105. In other embodiments, (e.g., when network service is unavailable or significantly degraded via edge clouds 125), central cloud 110 may also provide services to users, such as mobile user 135. The central cloud 110 may be a private cloud, a public cloud, or a hybrid cloud.

Backhaul network 115 may be a subnetwork of network 105 that may facilitate transfer of data between central cloud 110 and edge clouds 125 of edge network 120. For example, backhaul network 115 may transmit data stored at central cloud 110 to edge clouds 125, as well as transmit data from edge clouds 125 to central cloud 110 for storage. Additionally, backhaul network 115 may facilitate provision of services from central cloud 110 to users, such as the mobile user 135.

Edge network 120 may be a subnetwork at an edge of network 105 closer to physical locations of users, such as mobile user 135, that provides mobile edge computing functionalities. Edge network 120 may comprise plurality of edge clouds 125 (e.g., edge cloud 125A, edge cloud 125B, and edge cloud 125C). Each of edge clouds 125 may be a separate computing environment, having one or more servers and at least one data store for data persistency that can be attached to each server. However, each one of edge clouds 125 may be communicatively coupled to each other of edge clouds 125 through the backhaul network 115.

Edge clouds 125 may serve a primary role of service provisioning to users of network 105, such as mobile user 135. Edge clouds 125 may provide service via a cluster of access points 130. For example, edge cloud 125A may provide service via a first cluster of access points 130A, edge cloud 125B may provide service via a second cluster of access points 130B, and edge cloud 125C may provide service via a third cluster of access points 130C.

Access points 130, as illustrated, may include bases stations such as mobile base stations, cell towers, and central office base stations. In other embodiments, access points 130 may include a Radio Access Network (RAN), a radio network controller, a Cable Modem Termination System (CMTS), a Passive Optical Network (PON), hot spots, small cells, data center, routers, switches, Wi-Fi access points, or a combination thereof. Each cluster of the access points (e.g., first cluster of access points 130A, second cluster of access points 130B, and third cluster of access points 130C) may be located within a particular geographical area, and thus the service coverage area of each of the respective edge clouds 125 may correspond to that particular geographical area.

Mobile user 135 may be a mobile computing device communicatively coupled to and receiving service from the network 105. The computing device may include a laptop computer, a tablet computer, a smart phone, or wearable computing device, among other similar mobile devices capable of accessing and using network 105. In one embodiment, mobile user 135 may be communicatively coupled to one of edge clouds 125 directly via a respective access point. For example, mobile user 135 at time t may be communicatively coupled to edge cloud 125A, hereinafter referred to as source edge cloud 125A, directly via a respective access point in first cluster of access points 130A. In other embodiments, mobile user 135 may be communicatively coupled to central cloud 110 through backhaul network 115.

As previously described, the service coverage area of each of edge clouds 125 may correspond to a particular geographical area in which the associated cluster of access points 130 may be physically located. When mobile user 135 moves from one geographical area to another over a period of time, a determination may be made whether an edge cloud currently servicing mobile user 135 should continue servicing mobile user 135 or the service should be migrated to a new edge cloud servicing the geographical area to which mobile user 135 has moved.

For example, at the time t, mobile user 135 may receive service from source edge cloud 125A via a respective access point in first cluster of access points 130A located in a first geographical area. At a later time t+1 mobile user 135 may move to a second geographical area corresponding to a service coverage area of another edge cloud, such as edge cloud 125B, hereinafter referred to as target edge cloud. In response to the movement of mobile user 135, source edge cloud 125A can continue servicing mobile user 135, which may require transmitting service-related data to and from mobile user 135 via backhaul network 115 (e.g., service is effectively migrated to the central cloud 110). Or the service for mobile user 135 may be migrated from source edge cloud 125A to target edge cloud 120B.

In another example, an edge cloud, such as source edge cloud 125A, may be servicing a geographical area that is experiencing a significant increase in service requirements. For example, a gaming convention may be taking place in the first geographical area. As a result, service provided by source edge cloud 125A may degrade (e.g., latency may increase). Therefore, it may be advantageous to migrate service for at least some of the mobile users, including mobile user 135, to a different edge cloud, such as target edge cloud 125B.

Service migration from one edge cloud to another may be costly, but significant network performance degradation may occur if the service is maintained at the original edge cloud. It may be difficult to determine when and where to the migrate the service to ensure both cost efficiency and consistent quality of service and network performance for the user. Moreover, over a period of time (e.g., up to time t+n), mobile user 135 may move across different service coverage areas numerous times and a similar determination may be necessary for each movement detected. Embodiments of the disclosure may develop a learning-based service migration policy framework to be applied when the user moves from one geographical area to another to facilitate the determination of whether to migrate the service for the user and if so, to which edge cloud the service should be migrated to.

The elements described above of operating environment 100 (e.g., central cloud 110, backhaul network 115, edge clouds 125 of the edge network 120, access points 130, and mobile user 135) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 7, the elements of operating environment 100 may be practiced in a computing device 700.

While network 105 described in the operating environment 100 provides mobile edge computing services and the following examples describe a method for providing learning-based service migration in mobile edge computing, embodiments of learning-based service migration, as described herein, may also be applied to other cloud computing architectures. For example, learning-based service migration may be provided in networks comprising mobile micro-cloud services, cloudlet services, and follow me cloud services.

Figure 2:
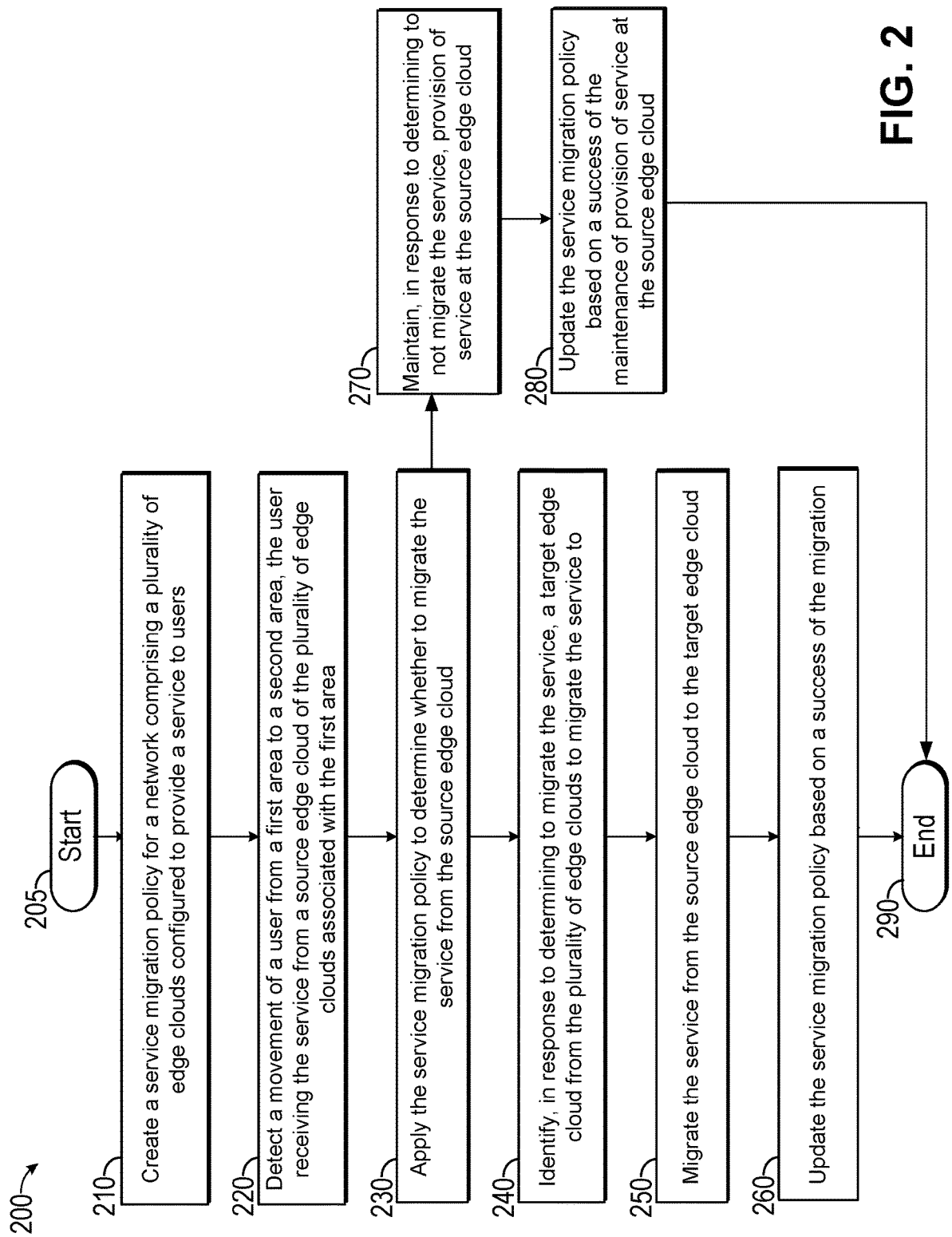
FIG. 2 is a flow chart of a method for providing learning-based service migration.

FIG. 2 is a flow chart setting forth the general stages involved in a method 200 consistent with embodiments of the disclosure for providing learning-based service migration. Method 200 may be implemented using an agent, where the agent may be central cloud 110, one of the edge clouds 125, or mobile user 135 described in FIG. 1. Ways to implement the stages of method 200 will be described in greater detail below.

Method 200 may begin at starting block 205 and proceed to stage 210 where a service migration policy may be developed for network 105. Network 105 may comprise, among other things, edge clouds 125 configured to provide service to users, such as mobile user 135. As described in more detail below with respect to FIG. 3, creating the service migration policy may comprise iteratively performing a reinforcement learning process over a period of time to develop an optimized policy determination function.

From stage 210, where the service migration policy may be created, method 200 may advance to stage 220 where a movement of mobile user 135 may be detected from a first area to a second area. Prior to the movement, mobile user 135 may be receiving the service from source edge cloud 125A associated with the first area. For example, source edge cloud 125A may provide service to mobile user 135 via an access point within first cluster of access points 130A physically located within the first area.

Once the movement of mobile user 135 is detected in stage 220, method 200 may continue to stage 230 where the service migration policy created in stage 210 may be applied to determine whether to migrate the service for mobile user 135 from source edge cloud 125A. Applying the service migration policy may include providing a current state of network 105 at a current time (e.g., at later time t+1 following the movement of mobile user 135), along with a prediction of a state-value function and an action-value function based as input into the policy determination function, as described in detail below with respect to FIG. 5 and FIG. 6. An action to perform at the later time t+1 may be received as output from the policy determination function. The action may include to either migrate the service from source edge cloud 125A or not migrate the service from source edge cloud 125A (e.g., maintain the service at the source edge cloud 125A).

In embodiments where the determination made at stage 230 is to migrate, method 200 may continue to stage 240, where target edge cloud 125B may be identified to migrate the service for mobile user 135 to. Identifying the target edge cloud 125B may include determining a QoS utility associated with each of a plurality of candidate target edge clouds (e.g., other edge clouds within the edge network 120 such as target edge cloud 125B and edge cloud 125C). Target edge cloud 125B may be identified as the candidate target edge cloud having a highest QoS utility. To determine the QoS utility associated with each of the plurality of candidate target edge clouds, factors including network latency, energy consumption, and a cost for each of the plurality of candidate target edge clouds to provide the service to mobile user 135, among other similar factors, may be determined and weighed against one another.

Once target edge cloud 125B is identified in stage 240, method 200 may proceed to stage 250 where service for the mobile user 135 may be migrated from source edge cloud 125A to target edge cloud 125B. Migration of the service may also include selecting a path for migration (e.g., a path to transfer service data from source edge cloud 125A to target edge cloud 125B). The path selection may be based on a cost and network latency associated with transferring the service data via the path. For example, in the process of service migration, related data on source edge cloud 125A (e.g., run-time state data on the hard disk and memory) should be transferred to target edge cloud 125B. Between source edge cloud 125A and target edge cloud 125B, there may exist various network topology and communication systems (e.g., Wi-Fi, 4G and 5G) that may result in different network connections and paths for data transferring with various transferring latency and cost. Therefore, those variances may be taken into consideration to select a transferring path with a lowest cost and minimum transferring time to improve QoS.

Once the service has migrated from source edge cloud 125A to target edge cloud 125B at stage 250, method 200 may proceed to stage 260 where the service migration policy created at stage 210 and applied at stage 230 may be updated based on a success of the migration. For example, following migration of the service to target edge cloud 125B, a QoS as perceived by mobile user 135 may be determined, along with a data transferring cost and a cost function associated with transferring time associated with the migration. The success of the migration may be measured based on the QoS as perceived by mobile user 135 less the data transferring cost and the cost function associated with transferring time. Updating the service migration policy at stage 260 may enable further optimization of the policy determination function to improve accuracy in future determination of whether to migrate the service or not. Once the service migration policy has been updated at stage 260, method 200 may then end at stage 290.

In embodiments where the determination made at stage 230, is to not migrate the service for the mobile user 135, the method 200 may proceed to stage 270 where provision of the service to mobile user 135 may be maintained at source edge cloud 125A. Method 200 may proceed to stage 280, where the service migration policy created at stage 210 and applied at stage 230 may then be updated based on a success of maintaining the provision of service at source edge cloud 125A. For example, a QoS as perceived by mobile user 135 may be determined, and the success may be measured based on the QoS as perceived by mobile user 135. Updating the service migration policy at stage 280, similar to the updating of the service migration policy at stage 260, may provide further optimization of the policy determination function to improve accuracy in future determination of whether to migrate the service or not. Once the service migration policy has been updated at stage 280, method 200 may then end at stage 290.

Figure 3:
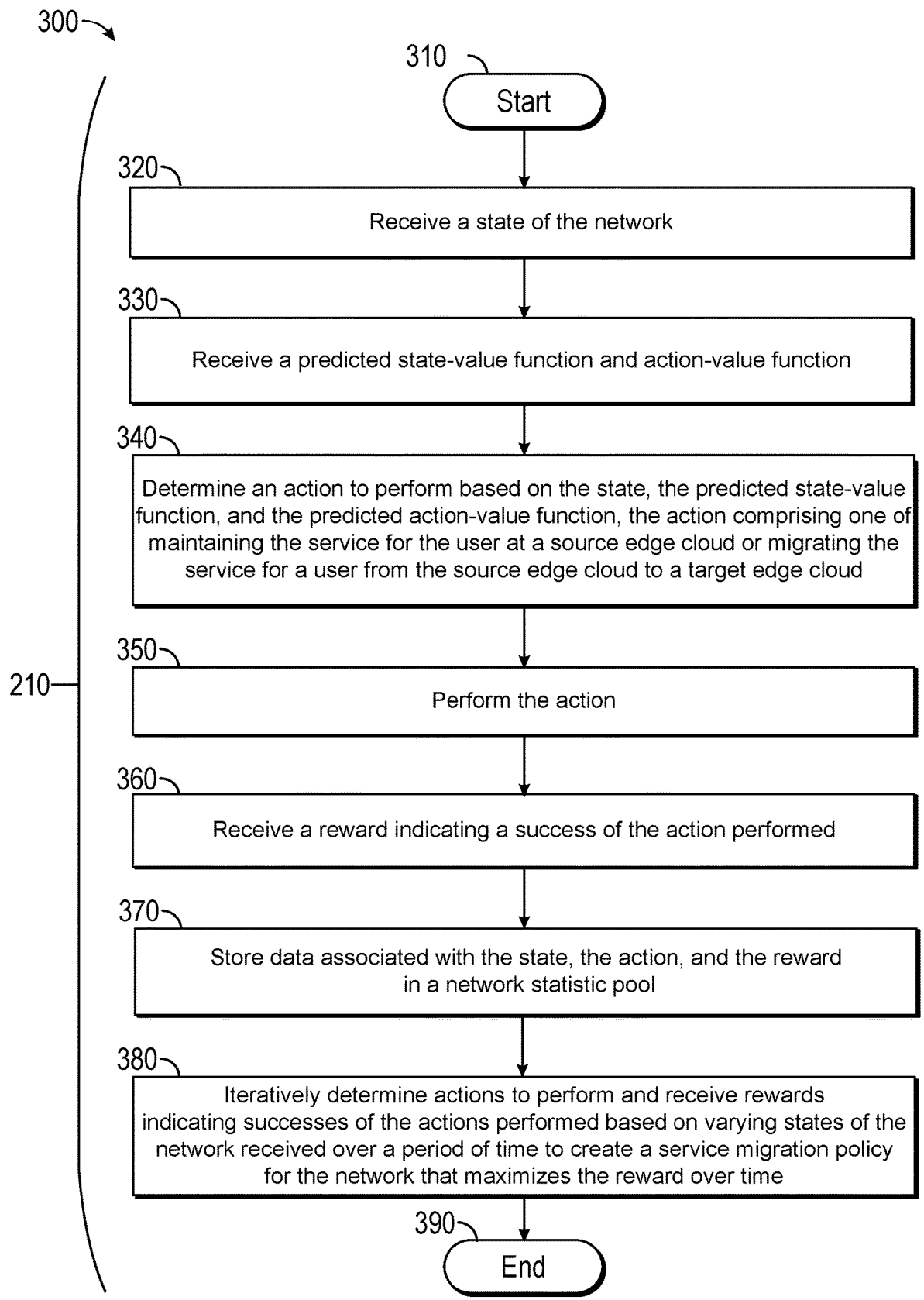
FIG. 3 is a flow chart of a method for creating a service migration policy for a network.

FIG. 3 is a flow chart of a method 300 consistent with embodiments of the disclosure for creating a service migration policy for network 105. Method 300 may be used to at least partially perform the stage 210 described in FIG. 2. Similar to method 200, method 300 may be implemented using an agent, where the agent may be central cloud 110, one of edge clouds 125, or mobile user 135 as described in FIG. 1. Ways to implement the stages of method 300 will be described in greater detail below.

Method 300 may begin at starting block 310 and proceed to stage 320 where the agent may receive a state of the network 105. The state may be based on network latency, energy consumption, and a cost for each of edge clouds 125 to serve each of the mobile users on network 105, including mobile user 135. Once the state is received at stage 320, method 300 may proceed to stage 330 where the agent may receive a predicted state-value function and action-value function output by a Deep Neural Network (DNN), as described in detail below with respect to FIG. 5 and FIG. 6.

Next, method 300 may proceed to stage 340, the agent may determine an action to perform based on the state received at stage 320 and the predicted state-value function and action-value function received at stage 330. For example, the state, the predicted state-value function, and the predicted action-value function may be provided as inputs to a policy determination function that outputs the action to be performed. The action received as output from the policy determination function may be a scalar representing an index of the edge cloud determined to serve to the mobile user 135. For example, the action may be a scalar representing an index of source edge cloud 125A that may be initially providing service to mobile user 135 at time t. In other embodiments, the action may be a scalar representing an index of target edge cloud 125B.

Once the action is determined at stage 340, method 300 may proceed to stage 350 where the action may be performed. For example, if the action is a scalar representing an index of source edge cloud 125A, source edge cloud 125A may maintain provision of service to mobile user 135. If the action is a scalar representing target edge cloud 125B, service for the mobile user 135 may be migrated from source edge cloud 125A to target edge cloud 125B.

After the action is performed at stage 350, method 300 may proceed to stage 360 where the agent may receive a reward indicating the success of the action performed. For example, if the service for mobile user 135 is migrated from source edge cloud 125A to target edge cloud 125B, the reward may be the QoS as perceived by mobile user 135 (e.g., latency) minus a data transferring cost and a cost function related to transferring. If service for mobile user 135 is maintained at the source edge cloud 125A, the reward may be the QoS as perceived by mobile user 135. In some embodiments where central cloud 110 serves as the agent, an overall reward may be received. The overall reward may be a summation of each reward per mobile user served by the network 105, including the reward for mobile user 135.

Then, method 300 proceeds to stage 370 where data associated with the state, the action, and the reward may be stored in a network statistic pool. The data stored in the network statistic pool may be used to train a Deep Neural Network (DNN) from which the agent receives the predicted state-value function and the predicted-action value function, as described in detail below with respect to FIG. 5 and FIG. 6.

Once the data associated with the state, the action, and the reward are stored at stage 370, the method 300 may proceed to stage 380 where the agent may iteratively determine actions to perform and receive rewards indicating successes of the actions performed based on varying states of network 105 received over a period of time to create a service migration policy for the network 105 that maximizes the reward over time. For example, the policy determination function may be optimized to ensure selection of future actions (e.g., to migrate service or not) that maximize future rewards based on future states of network 105.

Figure 4:
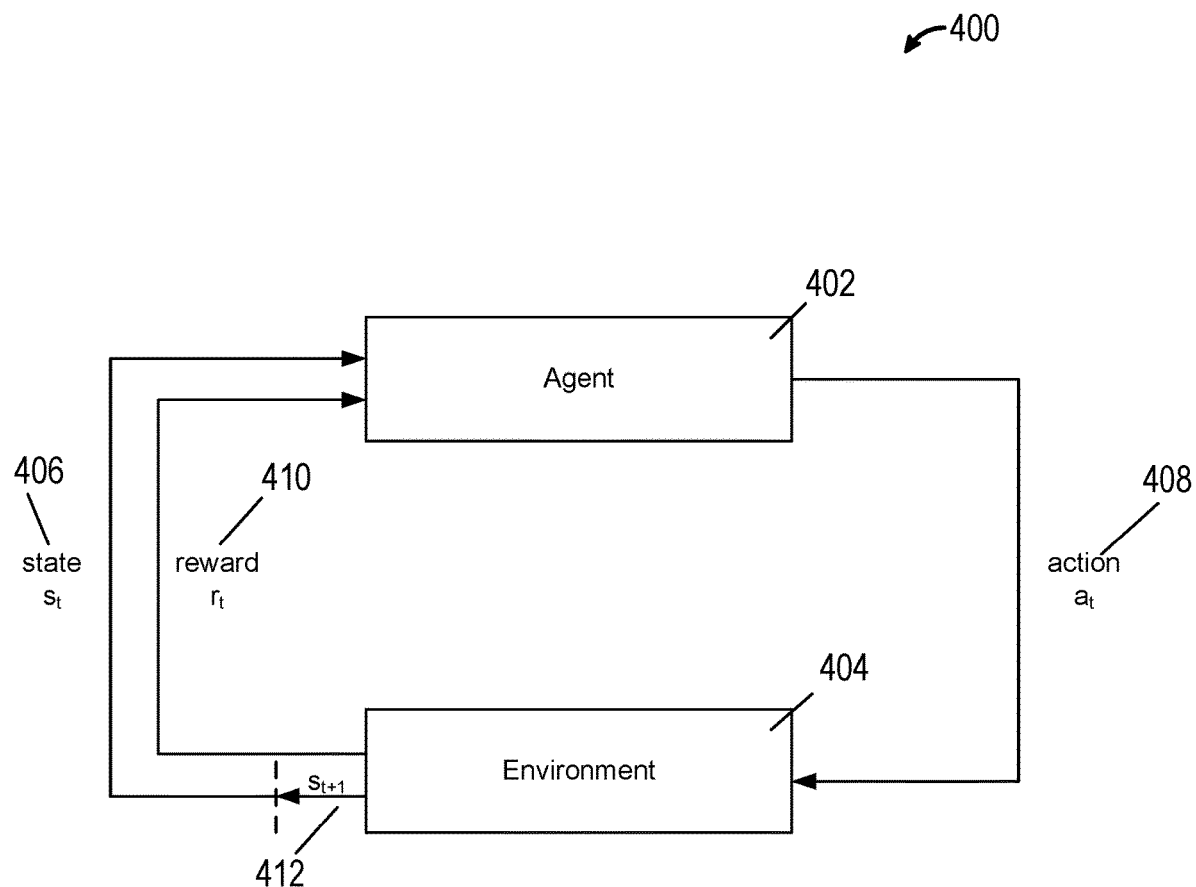
FIG. 4 is a block diagram illustrating a workflow for a reinforcement learning process.

FIG. 4 is a block diagram illustrating a workflow 400 for a reinforcement learning process. Reinforcement learning may comprise a type of machine learning technique that may be implemented by an agent 402 to learn by trial and error in a dynamic environment 404 using feedback from actions performed by agent 402. A service migration policy framework for network 105 may be based, for example, on reinforcement learning, as described in more detail below with respect to FIG. 5.

In the example workflow 400, agent 402 may have the capability to perform an action at time t (e.g., an action $a_t$ 408) based on a state of environment 404 at time t (e.g., a state $s_t$ 406). Action $a_t$ 408 may influence a future state of environment 404 at a future time t+1 (e.g., a future state $s_{t+1}$ 412). Additionally, agent 402 may receive a reward $r_t$ 410 from environment 404 indicating a success of action $a_t$ 408. The goal of agent 402 may be to determine an optimal policy for selecting future actions to maximize future rewards received from the environment 404.

The reinforcement learning may be modeled as a Markov Decision Process (MDP). For example, the MDP may be comprised of a sequence of elements <S,A,P,π,r,γ>. S may represent a finite state space comprising a state (s) for each time step (e.g., time t, time t+1 . . . time t+n). A may represent an action space comprising an action (a) chosen by agent 402 to perform at each time step (e.g., action $a_t$ 408). P may represent a transit probability set that maps each point (s,a) to a next state of the environment (e.g., future state $s_{t+1}$ 412). For example, the transit probability set may describe how the state of the environment changes when the action is performed depending on the action (a) and the state (s). 7 may represent a policy that agent 402 uses to determine which action (a) to perform based on a state (s) of environment 404 (e.g., π: s→a). R may represent a reward value that agent 402 receives from environment 404 after performing an action, which may be dependent on the state (s) and action (a) performed (e.g., r: s*a→r). γ may represent a discount factor that may control how rewards are weighted. For example, higher weight may be given to rewards received nearer than rewards received further in the future.

The policy used by agent 402 to determine which action to perform (e.g., the policy determination function) may comprise a state-value function and an action-value function. The state-value function ($V^\pi$ ($s_t$)) of the policy may represent how optimal the state (s) is for agent 402 to be in at a given time step, and may be defined as follows:

$$V^\pi(s_t) = E_\pi\left(\sum_{k=0}^{T-t-1} \gamma^k r_{t+k} \,\middle|\, s_t\right) = \sum_{a_t} \pi(a_t \mid s_t) Q^\pi(s_t, a_t).$$

The action-value function ($Q^\pi$ ($s_t$, $a_t$)) may represent how optimal it is for agent 402 to perform action (a) while being in state (s) at a given time step, and may be defined as follows:

$$Q^\pi(s_t, a_t) = E_\pi\left(\sum_{k=0}^{T-t-1} \gamma^k r_{t+k} \,\middle|\, s_t, a_t\right) = \sum_{k=0}^{T-t-1} \gamma^k (P^\pi)^k r_t,.$$

The state-value function and the action-value function may take as input the state (s) and action (a), and map the state (s) and action (a) to an average cumulative reward. Therefore, the policy may be optimized to maximize future rewards received from environment 404 by optimizing the state-value function and the action-value function.

However, calculating the state-value function and the action-value function as defined may not feasible in a service migration scenario because the transit probability may be difficult to obtain. Additionally, for service migration in a network implementing mobile edge computing, such as network 105, there are a large amount of states, and thus calculating the state-value function and the action-value function for all the possible states may not be feasible either. Therefore, the service migration policy framework may instead implement a DNN to predict the state-value function and the action-value function, as described below in more detail with respect to FIG. 5 and FIG. 6.

Additionally, the service migration policy framework for network 105 may implement model-free reinforcement learning, where agent 402 will not try to learn explicit models of the state transition and reward functions, rather agent 402 may directly derive an optimal policy from the interactions with environment 404. Implementing model-free learning ensures applicability to network 105 as it would otherwise be difficult to assume strong prior knowledge on a mobility trajectory of users and network dynamics. In some examples, deep reinforcement learning may be utilized so that network architectures with layers of non-linear hierarchal features may be trained.

Figure 5:
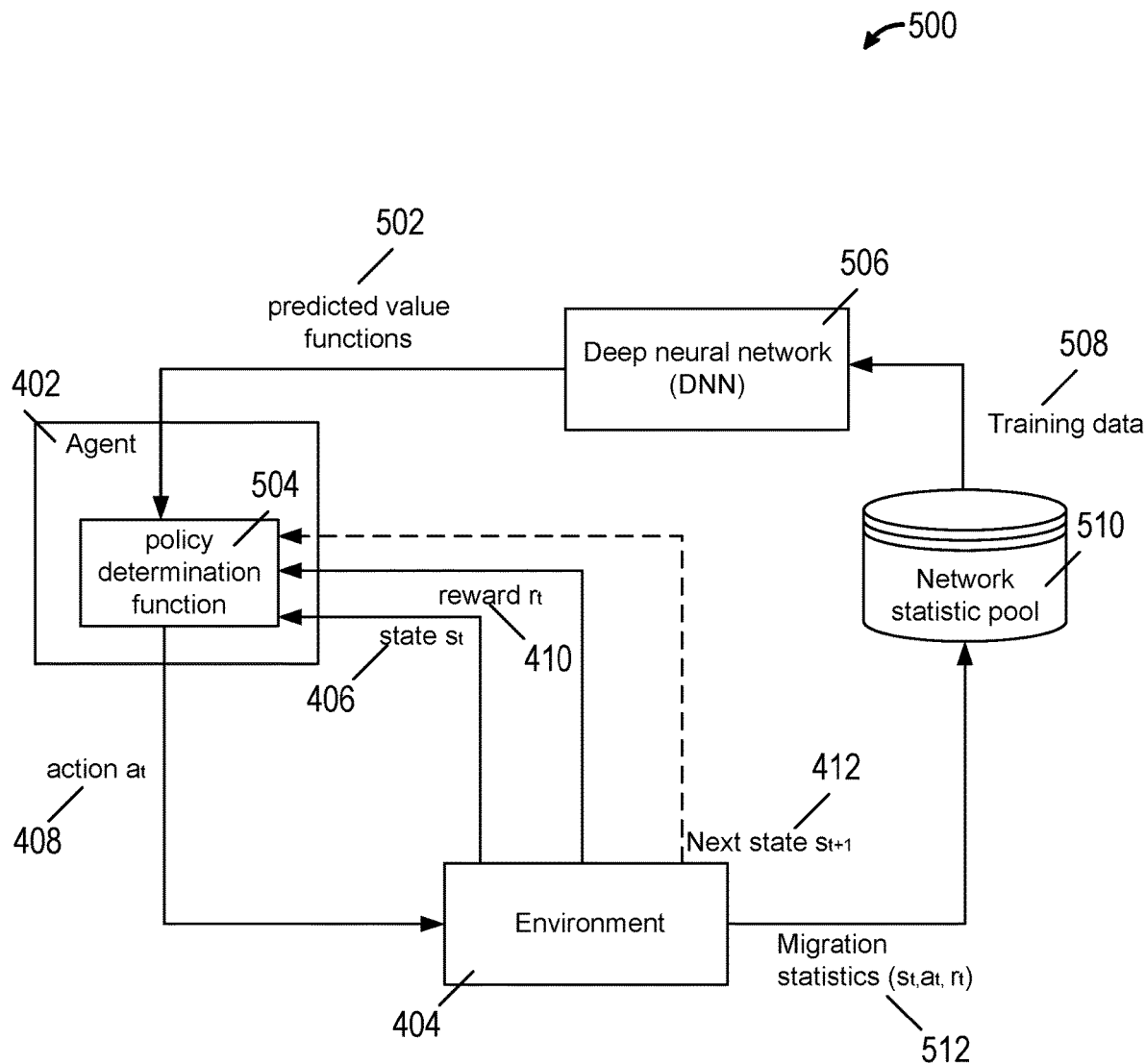
FIG. 5 is a block diagram illustrating a workflow for a reinforcement learning process employed to create a service migration policy for a network.

FIG. 5 is a block diagram illustrating a workflow 500 for a reinforcement learning process employed to create a service migration policy for network 105. Similar to workflow 400 described with respect to FIG. 5, reinforcement learning may be implemented by agent 402 to learn by trial and error in dynamic environment 404 using feedback from actions performed by agent 402. Agent 402 may be an entity within network 105. For example, agent 402 may be central cloud 110, one of edge clouds 125, or mobile user 135. Environment 404 may be network 105. Agent 402 may employ the reinforcement learning process to create a service migration policy for network 105 as described with respect to FIG. 3 and method 300.

In the example workflow 500, agent 402 may receive the state of environment 404 at time t (e.g., state $s_t$ 406). State $s_t$ 406 may be determined based on factors such as network latency, energy consumption, and a cost of each of edge clouds 125 to serve each of the mobile users at time t. Additionally, agent 402 may receive a predicted value functions 502 from a Deep Neural Network (DNN) 506. Predicted value functions 502 may include a state-value function and an action-value function as described in more detail above with respect to FIG. 4.

In some embodiments, DNN 506 may be co-located in agent 402, and agent 402 may receive predicted value functions 502 in real-time (e.g., receive predicted value functions 502 at each time step). In other embodiments, DNN 506 may be located in an alternative location distant from agent 402, and agent 402 may receive predicted value functions 502 at periodic intervals (e.g., receive predicted value functions every $n^{th}$ time step). While receiving predicted value functions 502 in real-time allows for greater accuracy, there is a consequential increase in signaling and data transferring overhead that, in some instances, may make periodic receipt more optimal.

Agent 402 may determine action $a_t$ 408 to be performed based on state at 406 and predicted value functions 502. For example, agent 402 may provide state $s_t$ 406 and predicted value functions 502 as inputs into a policy determination function 504. Action $a_t$ 408 may be provided as output from policy determination function 504, and agent 402 may perform action $a_t$ 408.

Action $a_t$ 408 provided as output may be a scalar representing an index of an edge cloud of network 105 determined to serve to mobile user 135. For example, action $A_t$ 408 may be a scalar representing an index of source edge cloud 125A that may be initially providing service to mobile user 135 at time t. Accordingly, performance of action $a_t$ 408 may include maintaining service for mobile user 135 at source edge cloud 125A. Action $a_t$ 408 may be a scalar representing an index of target edge cloud 125B. Accordingly, performance of action $a_t$ 408 may include migrating service for mobile user 135 from source edge cloud 125A to target edge cloud 125B.

Once action $a_t$ 408 is performed, a success of action $a_t$ 408 may be measured within environment 404 and received at agent 402 in form of scalar reward signal $r_t$ 410. For example, if action $a_t$ 408 performed was to maintain service for mobile user 135 at source edge cloud 125A, reward signal $r_t$ 410 may represent a QoS as perceived by mobile user 135. If action $a_t$ 408 performed was to migrate service for mobile user 135 from source edge cloud 125A to target edge cloud 125B, reward signal $r_t$ 410 may represent a QoS as perceived by mobile user 135 following migration of the service to target edge cloud 125b less a transferring cost and a cost function associated with transferring time associated with the migration.

Additionally, action $a_t$ 408 performed may influence a next state of the environment at a future time t+1 (e.g., next state $s_{t+1}$ 412). For example, if the service for mobile user 135 was migrated, factors associated with network 105, such as network latency, energy consumption, and a cost of edge clouds 125 to serve each of the users may be affected. Agent 402 may receive next state $s_{t+1}$ 412 of environment 404 in real-time, and utilizing reward signal $r_t$ 410 and next state $r_{t+1}$ 412, agent 402 may update policy determination function 504 to optimize the service migration policy for network 105 such that future migration-related actions may be selected to maximize future rewards.

Additionally, the data associated with state $s_t$ 406, action $a_t$ 408, and reward $r_t$ 410 at time t (e.g., migration statistics 512) may be provided to a network statistic pool 510 for storage. The migration statistics may be used as training data 508 to train DNN 506 and continuously improve accuracy of predicted value functions 502 output by DNN 506, as described in more detail below with respect to FIG. 6. The above-described refinement learning process may be performed iteratively at each time step over a period of time t+n.

Figure 6:
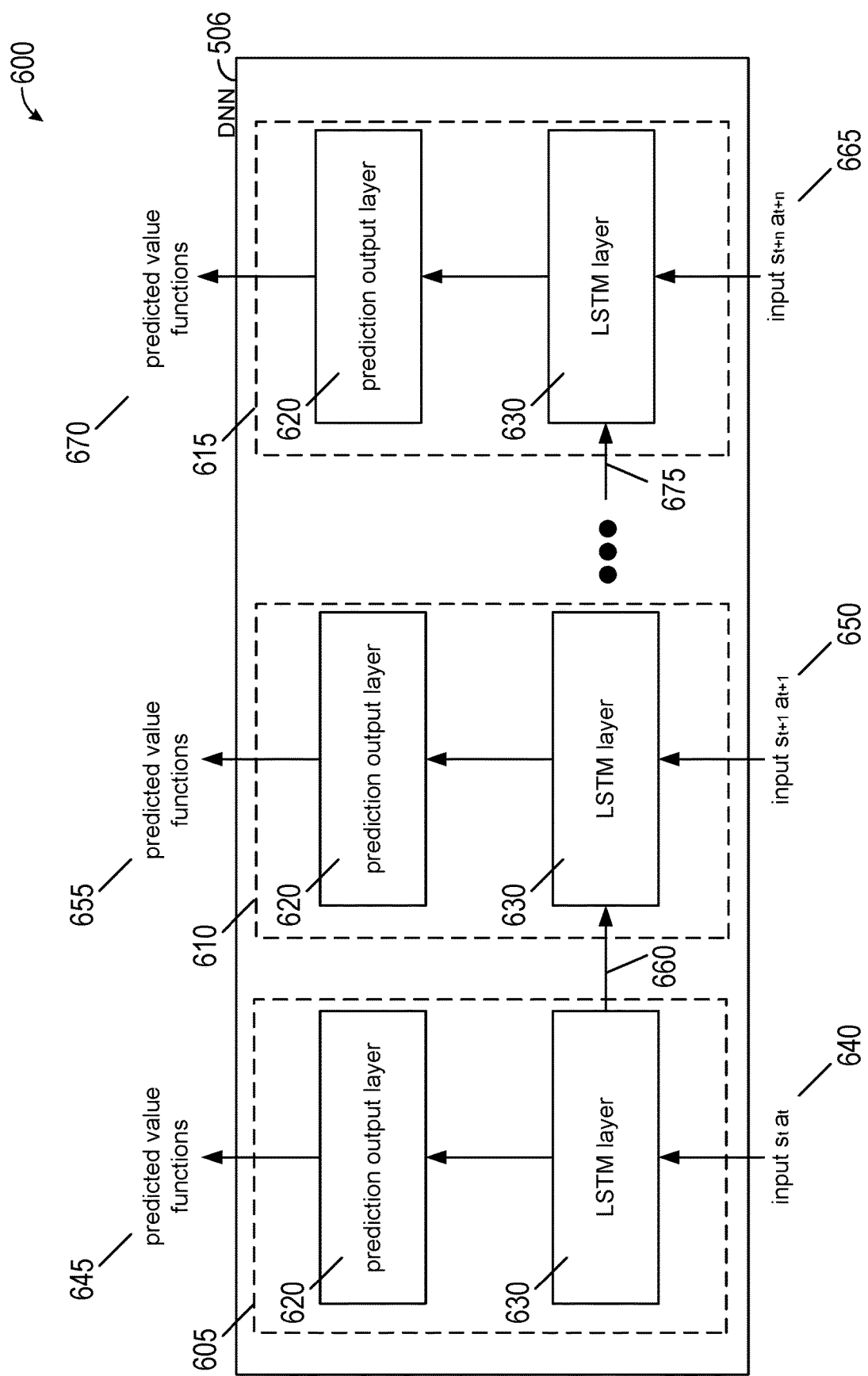
FIG. 6 is a schematic illustration of a network structure for predicting value functions.

FIG. 6 is a schematic illustration of a network structure 600 for predicting value functions. The predicted value functions may include a state-value function and an action-value function described in more detail above with respect to FIG. 4. The network structure 600 may implement DNN 506. For example, as shown in FIG. 6, DNN 506 may comprise a plurality of repeating modules 605, 610, and 615, where each of the repeating modules 605, 610, and 615 may include a prediction output layer 620 and a Long Short-Term Memory (LSTM) layer 630. State values and action values may depend on dynamics of network 105, which may have a correlation in time. Accordingly, the LSTM layer 630 may be utilized to facilitate a time series analysis to predict value functions in time.

DNN 506 may be trained using truncated back-propagation through time technique (TBPTT). A goal of TBPTT may be to modify weights of DNN 506 in order to minimize an error of network outputs compared to an expected output in response to corresponding inputs (e.g., to increase an accuracy of the predicted value functions). TBPTT may comprise processing of input and output data via a supervised learning algorithm that enables DNN 506 to be updated or corrected based on specific errors made. Processing may occur one time step at a time and the update may be performed periodically (e.g., performed back for a fixed number of time steps). For example, a training input pattern may be input and propagated through each layer of DNN 506 to obtain an output. Predicted outputs may be compared to expected outputs to calculate any error. Derivatives of the error may be calculated with respect to the network weights, where the weights may be adjusted to minimize the error. This process may be repeated iteratively at each of the repeating modules 605, 610, and 615, for example. In some examples, the calculated errors may be accumulated across the fixed number of time sets, and the weights may be adjusted based on the accumulated errors.

The training input pattern may include state and action values at a particular time step. These state and action values may be data extracted from migration statistics collected over a period of time, including migration statistics 512, that are stored in the network statistic pool as described in more detail with respect to FIG. 5. A predicted state-value function and a predicted action-value function may be provided as output, which may then be provided to agent 402 for use as an input for policy determination function 504, described in more detail above with respect to FIG. 5.

For example, in module 605, state and action values at time step t (e.g. state $s_t$ 406 and action $a_t$ 408) may be provided as input 640 and a predicted state-value function and a predicted action-value function may be provided as output 645. In module 610, state and action values at time step t+1 may be provided as input 650, a cell status and a hidden status from a previous LSTM layer (e.g., LSTM layer 630 of module 605) may be provided as input 660, and a predicted state-value function and a predicted action-value function may be provided as output 655. To represent the iterative nature of the TBTPP process over time, in module 615, state and action values at time step t+n may be provided as input 665, a cell status and a hidden status from a previous LSTM layer may be provided as input 675, and a predicted state-action value function may be provided as output 670. The cell status may be associated with a memory of the previous LSTM layer and the hidden status may be associated with an output of the previous LSTM layer, including data associated with any calculated errors and weight adjustments.

In some examples, parameters of DNN 506 may be initialized using supervised learning to increase training speed. For example, preliminary results may be obtained using the Markov Decision Process (MDP) described in more detail above with respect to FIG. 4. For example, the action-value function and the state-value function may be calculated using the definition in (1) and (2). DNN 506 may be trained using the preliminary results via supervised learning, and resultant parameters may be used to initialize DNN 506.

Additionally, after DNN 506 is trained with a significant amount of data, transfer learning may be exploited. For example, DNN 506 may be used to initialize any newly deployed network in order to further speed up the training progress and improve the performance at the beginning of new network deployment.

According to some example embodiments, a service migration policy may be created for a network. The network may comprise a plurality of edge clouds configured to provide a service to users. A movement of a user from a first area to a second area may be detected. The user may be receiving the service from a source edge cloud of the plurality of edge clouds associated with the first area. The service migration policy may be applied to determine whether to migrate the service from the source edge cloud. In response to determining to migrate the service, a target edge cloud may be identified from the plurality of edge clouds to migrate the service to, and the service may be migrated from the source edge cloud to the target edge cloud. The service migration policy may then be updated based on a success of the migration.

In other example embodiments, creating the service migration policy for the network may include iteratively performing a reinforcement learning process over a period of time to develop a policy determination function. The reinforcement learning process may include receiving a state of the network, receiving a predicted state-value function and a predicted action-value function, and determining an action to perform based on the state, the predicted state-value function, and the predicted action-value function. The action may include migration of the service or no migration of the service. The reinforcement learning process may also include receiving a reward indicating a success of the action performed, and storing the state, the action, and the reward associated in a network statistic pool. The predicted state-value function and the predicted action-value function may be received as output from a DNN. The DNN may be trained with data stored in the network statistic pool using a truncated back propagation through time technique.

In further example embodiments, determining whether to migrate the service from the source edge cloud based on the service migration policy includes receiving a current state of the network at a current time, receiving a prediction of a state-value function and an action-value function from the DNN, providing the current state and the prediction as input into the policy determination function, and receiving, as output from the policy determination function, a current action to perform at the current time. The current action may be to migrate the service or not migrate the service. Updating the service migration policy based on the success of the migration may include receiving a reward indicating the success of the migration. The reward may be measured as a QoS as perceived by the user less a data transferring cost and a cost function associated with transferring time for the migration. In response to determining not to migrate the service, provision of the service from the source edge cloud to the user may be maintained, and the service migration policy may be updated based on a success of not migrating the service. A reward indicating the success of not migrating the service may be received, and the reward may be measured as a QoS as perceived by the user.

In yet further example embodiments, the target edge cloud may be identified by determining a QoS utility associated with each of a plurality of candidate target edge clouds, and identifying the target edge cloud as the candidate target edge cloud having a highest QoS utility. Determining the QoS utility associated with each of the plurality of candidate target edge clouds may include determining network latency, energy consumption, and a cost for each of the plurality of candidate target edge clouds to provide the service to the user. Migrating the service from the source edge cloud to the target edge cloud may include selecting a path to transfer data from the source edge cloud to the target edge cloud based on a cost and a latency associated with transferring the data along the path.

According to other example embodiments, a state of a network may be received. The network may include a plurality of edge clouds configured to provide a service to users. A predicted state-value function and a predicted action-value function may also be received. Then, an action to perform may be determined based on the state, the predicted state-value function, and the predicted action-value function. The action may include maintaining the service for a user at a source edge cloud or migrating the service for the user from the source edge cloud to a target edge cloud. The action may be performed, and a reward indicating a success of the action performed may be received. Data associated with the state, the action, and the reward in a network may be stored in a network statistic pool. Actions to perform and rewards indicating successes of the actions performed may be iteratively determined and received based on varying states of the network received over a period of time to optimize a service migration policy for the network.

According to further example embodiments, a system may include a memory storage being disposed in an agent and a processing unit coupled to the memory storage and being disposed in the agent. The agent may be an entity within a network that comprises a plurality of edge clouds configured to provide a service to users. The processing unit may be operative to receive a state of the network, a predicted state-value function, and a predicted action-value function, and determine an action to perform based on the state, the predicted state-value function, and the predicted action-value function. The action may include maintaining the service for a user at a source edge cloud or migrating the service for the user from the source edge cloud to a target edge cloud. The processing unit may also be operative to perform the action, determine a reward indicating a success of the action performed, and store data associated with the state, the action, and the reward in a network statistic pool. The processing unit may further be operative to iteratively determine actions to perform and rewards indicating successes of the actions performed based on varying states of the network received over a period of time to optimize a service migration policy for the network.

Figure 7:
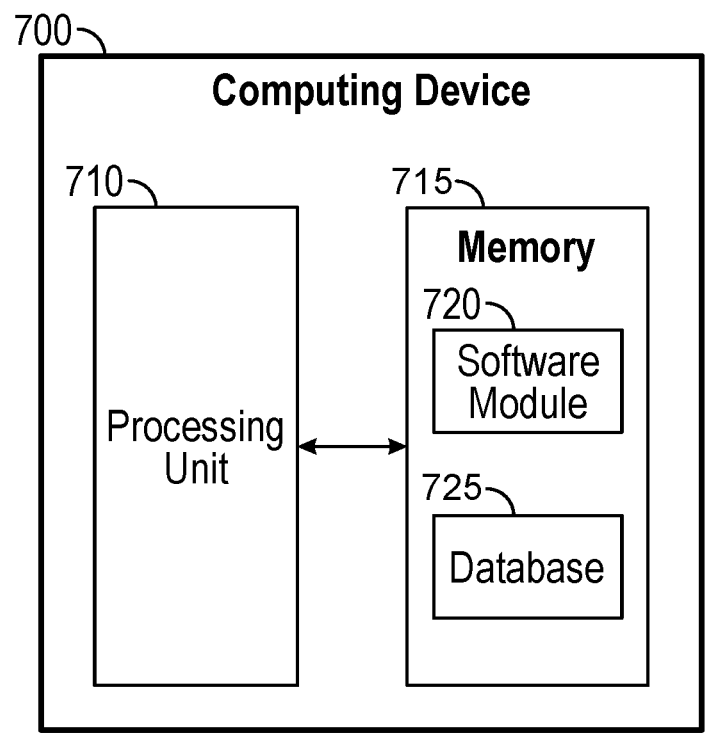
FIG. 7 is a block diagram of a computing device.

FIG. 7 shows computing device 700. As shown in FIG. 7, computing device 700 may include a processing unit 710 and a memory unit 715. Memory unit 715 may include a software module 720 and a database 725. While executing on processing unit 710, software module 720 may perform, for example, processes for learning-based service migration, including for example, any one or more of the stages from method 200 and method 300 described above with respect to FIG. 2 and FIG. 3, respectively. Computing device 700, for example, may provide an operating environment for elements of operating environment 100 including, but not limited to, the network 105 comprising the central cloud 110, the backhaul network 115, the edge clouds 125 of the edge network 120, the access points 130, and the mobile user 135. Elements of operating environment 100 (e.g., the network 105 comprising the central cloud 110, the backhaul network 115, the edge clouds 125 of the edge network 120, the access points 130, and the mobile user 135) may operate in other environments and are not limited to computing device 700.

Computing device 700 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 700 may comprise any computer operating environment, such as hand-held devices, multi-processor systems, microprocessor-based or programmable sender electronic devices, minicomputers, mainframe computers, and the like. Computing device 700 may also be practiced in distributed computing environments where tasks are performed by remote processing devices. The aforementioned systems and devices are examples and computing device 700 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 700 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving a state of a network, the network comprising a plurality of edge clouds configured to provide a service to users;
receiving a predicted state-value function and a predicted action-value function;
determining an action to perform based on the state, the predicted state-value function, and the predicted action-value function, the action comprising one of maintaining the service for a user at a source edge cloud or migrating the service for the user from the source edge cloud to a target edge cloud;
performing the action;
receiving a reward indicating a success of the action performed;
storing data associated with the state, the action, and the reward in a network statistic pool;
iteratively determining actions to perform and receive rewards indicating successes of the actions performed based on varying states of the network received over a period of time to optimize a service migration policy for the network; and
wherein, in response to the action comprising migration of the service for the user from the source edge cloud to the target edge cloud, receiving the reward indicating the success of the action comprises receiving a scalar value representing a Quality of Service (QoS) as perceived by the user less a data transferring cost and a cost function associated with transferring time for the migration.

2. The method of claim 1, wherein receiving the predicted state-value function and the predicted action-value function comprises receiving the predicted state-value function and the predicted action-value function as output from a Deep Neural Network (DNN), the DNN trained with data stored in the network statistic pool.

3. The method of claim 1, wherein determining the action to perform based on the state, the predicted state-value function, and the predicted action-value function comprises:
providing the state, the predicted state-value function, and the predicted action-value function as input to a policy determination function; and
receiving the action as output from the policy determination function.

4. The method of claim 1, wherein, in response to the action comprising maintenance of the service for the user at the source edge cloud, receiving the reward indicating the success of the action comprises receiving a scalar value representing a Quality of Service (QoS) as perceived by the user.

5. A system comprising:
a memory storage being disposed in an agent, wherein the agent is an entity within a network that comprises a plurality of edge clouds configured to provide a service to users; and
a processing unit coupled to the memory storage and being disposed in the agent, wherein the processing unit is operative to:
receive a state of the network;
receive a predicted state-value function and a predicted action-value function;
determine an action to perform based on the state, the predicted state-value function, and the predicted action-value function, the action comprising one of maintaining the service for a user at a source edge cloud or migrating the service for the user from the source edge cloud to a target edge cloud;
perform the action;
determine a reward indicating a success of the action performed;
store data associated with the state, the action, and the reward in a network statistic pool;
iteratively determine actions to perform and rewards indicating successes of the actions performed based on varying states of the network received over a period of time to optimize a service migration policy for the network; and
wherein, in response to the action comprising migration of the service for the user from the source edge cloud to the target edge cloud, receive the reward indicating the success of the action comprises receiving a scalar value representing a Quality of Service (QoS) as perceived by the user less a data transferring cost and a cost function associated with transferring time for the migration.

6. The system of claim 5, wherein the state of the network includes a latency of the network, an amount of energy consumed by the network, and a cost for each of the plurality of edge clouds to provide the service to the users.

7. The system of claim 5, wherein the network further comprises a central cloud, a backhaul network, and a plurality of access points corresponding the plurality of edge clouds.

8. The system of claim 7, wherein the agent is the central cloud, one of the plurality of edge clouds, or one of the users.

9. The system of claim 5, wherein the predicted state-value function and the predicted action-value function are received as output from a Deep Neural Network (DNN) trained with data stored in the network statistic pool.

10. The system of claim 9, wherein the processing unit is further operative to store data associated with the varying states and corresponding iteratively determined actions and rewards in the network statistic pool to enable continuous training of the DNN.

11. A non-transitory computer-readable medium that stores a set of instructions which when executed perform a method executed by the set of instructions comprising:
receiving a state of a network, the network comprising a plurality of edge clouds configured to provide a service to users;
receiving a predicted state-value function and a predicted action-value function;
determining an action to perform based on the state, the predicted state-value function, and the predicted action-value function, the action comprising one of maintaining the service for a user at a source edge cloud or migrating the service for the user from the source edge cloud to a target edge cloud;
performing the action;
receiving a reward indicating a success of the action performed;
storing data associated with the state, the action, and the reward in a network statistic pool;
iteratively determining actions to perform and receive rewards indicating successes of the actions performed based on varying states of the network received over a period of time to optimize a service migration policy for the network; and
wherein, in response to the action comprising migration of the service for the user from the source edge cloud to the target edge cloud, receiving the reward indicating the success of the action comprises receiving a scalar value representing a Quality of Service (QoS) as perceived by the user less a data transferring cost and a cost function associated with transferring time for the migration.

12. The non-transitory computer-readable medium of claim 11, wherein receiving the predicted state-value function and the predicted action-value function comprises receiving the predicted state-value function and the predicted action-value function as output from a Deep Neural Network (DNN), the DNN trained with data stored in the network statistic pool.

13. The non-transitory computer-readable medium of claim 11, wherein determining the action to perform based on the state, the predicted state-value function, and the predicted action-value function comprises:
providing the state, the predicted state-value function, and the predicted action-value function as input to a policy determination function; and
receiving the action as output from the policy determination function.

14. The non-transitory computer-readable medium of claim 11, wherein, in response to the action comprising maintenance of the service for the user at the source edge cloud, receiving the reward indicating the success of the action comprises receiving a scalar value representing a Quality of Service (QoS) as perceived by the user.

* * * * *